United States Patent [19]

Oda

[11] Patent Number: 5,528,291
[45] Date of Patent: Jun. 18, 1996

[54] CCD IMAGE PICKUP DEVICE AND METHOD OF DRIVING WHICH MAINTAINS SENSITIVITY REGARDLESS OF THE OPERATING MODE

[75] Inventor: Kazuya Oda, Tokyo, Japan

[73] Assignee: Fuji Photo Film Co., Ltd., Kanagawa-Ken, Japan

[21] Appl. No.: 950,321

[22] Filed: Sep. 24, 1992

[30] Foreign Application Priority Data

Sep. 25, 1991 [JP] Japan .................................. 3-246281
Oct. 7, 1991 [JP] Japan .................................. 3-259320

[51] Int. Cl.⁶ .................................................. H04N 5/225
[52] U.S. Cl. .......................... 348/220; 348/248; 348/322
[58] Field of Search ........................ 358/213.11, 213.23, 358/213.24, 213.28, 213.29, 213.26, 213.27, 213.15, 213.16, 213.31, 213.22, 213.19, 167; 257/223, 229, 230; 348/220, 230, 241, 248, 249, 250, 256, 320, 322, 324, 323

[56] References Cited

U.S. PATENT DOCUMENTS 4,845,568  7/1989  Hieda ................................. 358/213.31
4,875,100  10/1989  Yonemoto et al. ................. 358/213.19
4,963,983  10/1990  Kohno et al. ...................... 358/213.31
5,044,000  8/1991  Iijima ......................................... 377/60
5,051,832  9/1991  Losee et al. ....................... 358/213.29

*Primary Examiner*—Joseph Mancuso
*Assistant Examiner*—Tuan V. Ho

[57] ABSTRACT

In a monitor mode, the saturated electric charge amount of a plurality of first, second, third, and fourth types of photoelectric conversion elements disposed in matrix form on a semiconductor substrate is set to one half a saturated electric charge amount during a still mode. In the monitor mode, electric charges stored by two of the four types of photoelectric conversion elements are transferred to vertical CCDs, mixed and vertically transferred to a horizontal CCD. In the still mode, electric charges of one of the four types of photoelectric conversion elements at a time for a 1 V period (where V is a vertical scan period) are transferred to vertical CCDs and vertically transferred to the horizontal CCD. Furthermore, in the still mode, initially, the electric charges in the photoelectric conversion elements are cleared out for 4n * V periods, where n is a positive integer. Thereafter, smear electric charges are swept out from the vertical CCDs during a 1 V period.

19 Claims, 15 Drawing Sheets

FIG. IA
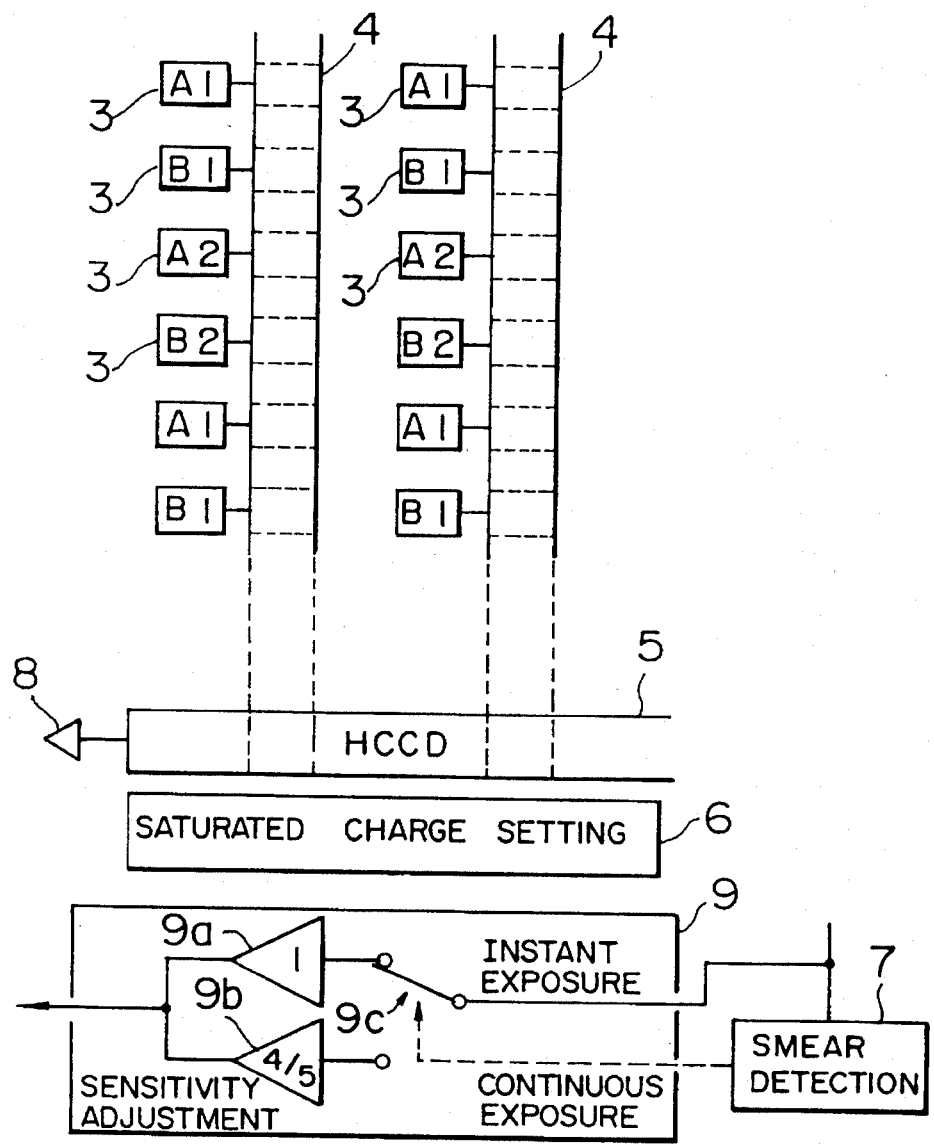
FIG. IB
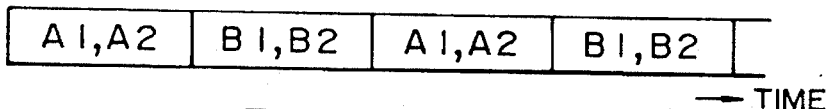
FIG. IC
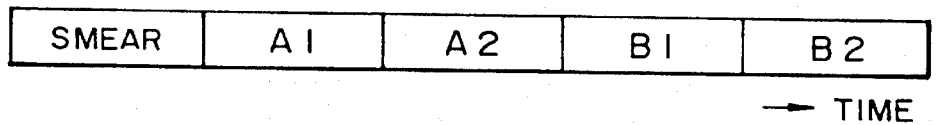

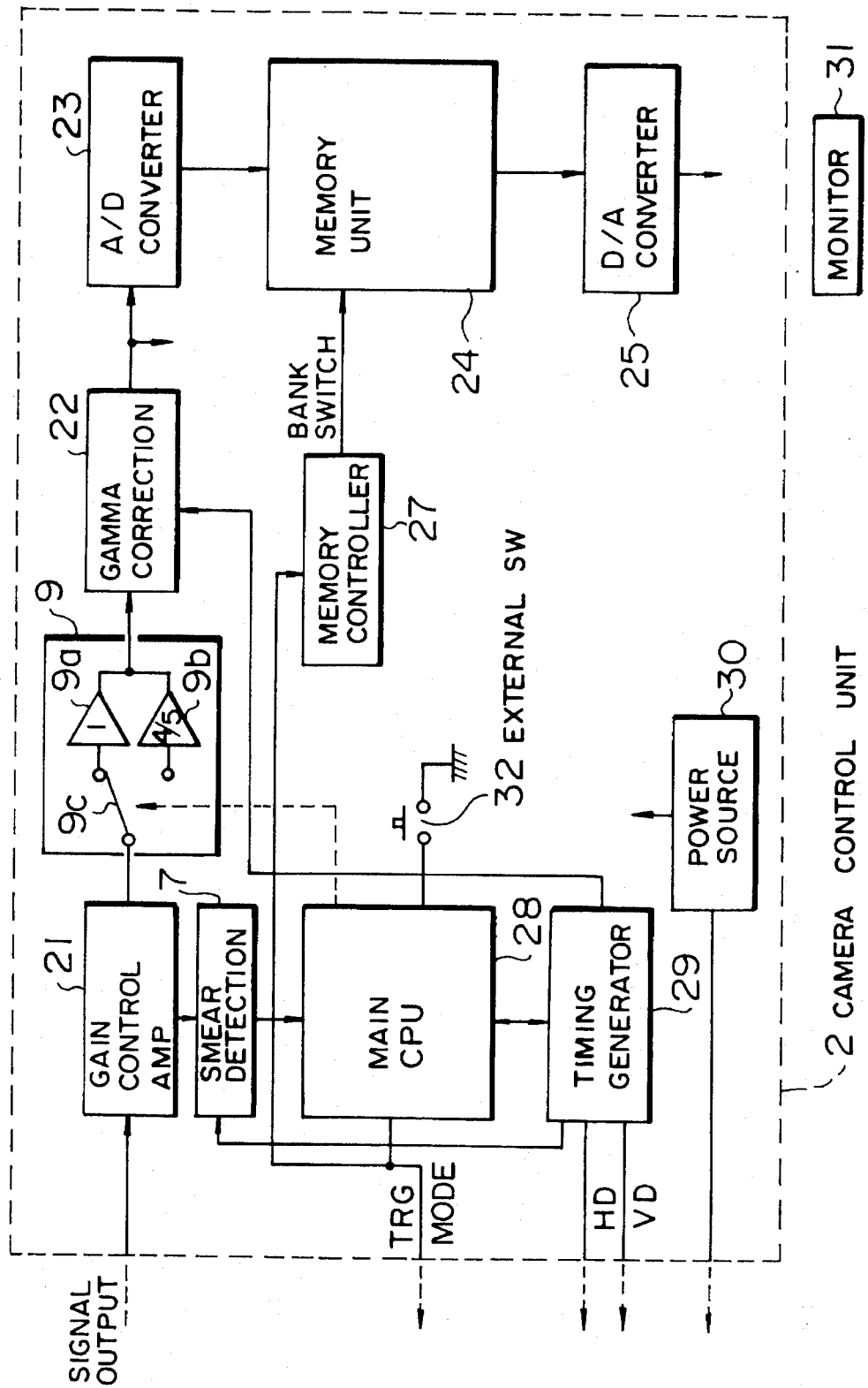

5,528,291

CCD IMAGE PICKUP DEVICE AND METHOD OF DRIVING WHICH MAINTAINS SENSITIVITY REGARDLESS OF THE OPERATING MODE

BACKGROUND OF THE INVENTION a) Field of the Invention

The present invention relates to a solid state image pickup device, and more particularly to a solid state image pickup device of high resolution having a number of photoelectric conversion elements, and a method of driving such a solid state image pickup device.

b) Description of the Related Art

Extensive developments of solid state image pickup devices have been made particularly for video cameras. High resolution is one of such developments. Solid state image pickup devices having 2 to 4 millions pixels have been developed for use with high definition televisions (HD-TV), mechanical measurements, astronomical observations, and the like.

However, solid state image pickup devices presently used in practice for commercial color cameras typically of 525 vertical scan lines are only those having four hundred thousands pixels or less.

Solid state image pickup devices having more pixels are desired when considering applications to still video cameras, image input apparatuses, electronic overhead projectors (OHP) and the like which would require vertical scan lines more than 525.

The present applicants have studied an optimum number of pixels from theoretical calculations and image simulation, and reached a conclusion that the number of pixels about eight hundred thousand is sufficient for such applications. Based upon this conclusion, various proposals have been made for CCD color sensors having about eight hundred thousand pixels.

For an image having an aspect ratio of about 3:4, it has been found that an optimum layout of eight hundred thousand pixels is about 1000 pixels in the vertical direction and about 800 pixels in the horizontal direction.

Specifically, about 1000 photodiodes in the vertical direction and about 800 photodiodes in the horizontal direction are disposed in a matrix form. Vertical CCD (VCCD) columns for transferring electric charges in the vertical direction are provided in juxtaposition with photodiode columns. A horizontal CCD (HCCD) row for transferring electric charges in the horizontal direction is coupled to the output terminals of the VCCD columns.

In order to read electric charges from about 1000 pixels disposed in the vertical direction, VCCD is used which has two transfer cells per one row for example.

A method of reading image information in a short time period has been proposed, whereby photodiodes in the vertical direction are classified into four types, and electric charges from two types of photodiodes are read at a time. With this method, information of all pixels can be read in 2 V periods where V is a vertical scan period. In this case, because the requirement to be met when transferring electric charges the horizontal direction, two HCCD rows are provided to transfer two types of electric charges at a time.

In the system using two HCCD rows, the intensity of image signals changes depending on which HCCD row was used for charge transfer. This intensity level difference of image signals appears as a flicker phenomenon particularly for a three chip color image pickup device.

In order t,o avoid such a phenomenon, the present applicants have proposed a method of reading all image information in 4 V periods where V is a vertical scan period. With this method, it is possible to reproduce a still image with a high precision.

During a monitor mode prior to taking a still image (including a movie mode for taking moving images), an image reproduced by using the NTSC television method to reproduce it in a short time.

FIGS. 2A to 2D illustrate a high resolution solid state image pickup device according to the conventional technique.

FIG. 2A schematically shows the structure of a image pickup device. A number of photodiodes 3 are disposed in a matrix form. For example, about 800 photodiodes are provided for each row of about 1000 rows. Photodiodes 3 of each row are classified into four types A1, B1, A2, and B2 in the descending order in each column.

VCCD 4 is provided in juxtaposition with each photodiode 3 column. VCCD 4 has two transfer cells per one row, eight cells of four rows forming one unit. Insulated electrodes are formed on transfer cells along the semiconductor transfer channel. Transfer cells of one unit are applied with control signals V1, V2, V3, V4, V5, V2, V6, and V4 in the descending order in each column.

Electric charges accumulated in each photodiode are moved to a corresponding cell of an adjacent VCCD 4 by applying a high voltage to the cell. The electric charges in VCCD 4 are transferred downward in the vertical direction by sequentially and selectively applying predetermined voltages to the electrodes of VCCD 4.

HCCD 101 is connected in common to the lower ends of all VCCDs 4. Electric charges transferred downward in each VCCD 4 are transferred to HCCD 101 in response to control signals.

Shift gates SG 103 capable of selectively transferring electric charges are provided in juxtaposition with HCCD 101. Another HCCD 102 is provided under the shift gates SG 103.

The shift gates SG 103 and HCCD 102 under the shift gates SG 103 are omitted in an image pickup device which reads electric charges stored in all the photodiodes 3 in 4 V periods.

FIG. 2B illustrates the mode of reading electric charges stored in all the photodiodes 3 in 2 V periods. Electric charges of photodiodes A1 and A2 are read during the first V period, and those of photodiodes B1 and B2 are read during the next V period. In this manner, electric charges of all the photodiodes 3 can be read in 2 V periods.

In this mode, electric charges stored in photodiodes A2 and B2 are attenuated by a transfer loss at the shift gates SG 103, whereas electric charges stored in photodiodes A1 and B1 are not subject to such attenuation. In addition, a difference between characteristics of HCCD 101 and HCCD 102 and a difference between amplifier characteristics of output amplifiers FDA 1 and FDA 2 are superposed to the attenuation.

FIG. 2C illustrates the mode of reading electric charges of all photodiodes in 4 V periods. Electric charges of photodiodes A1 are read during the first V period, those of photodiodes A2 are read during the second V period, those of photodiodes B1 are read during the third V period, and those of photodiodes B2 are read during the fourth V period.

In this charge reading mode, all electric charges are read via only HCCD 101 and FDA1, and so it is easy to make uniform the charge read characteristic. In the case of an instant exposure, a strong light is radiated to a solid state image pickup device. Therefore, smear electric charges are generated in CCD of the image pickup device. If signal charges are picked up without considering smear electric charges, signals picked up at the first field contain smear electric charges which can be neglected at other fields.

FIG. 2D illustrates the mode of reading electric charges in 4 V periods under an instant exposure. After an instant exposure by an operation of an electronic flash lamp, mechanical shutter or the like, smear electric charges in CCD are swept out during the next V period. During the following 4 V periods, signal charges are read from photodiodes in the similar manner described with FIG. 2C.

In the case of an instant exposure, after smear electric charges are swept out, signal charges are read in 4 V periods as described above. Therefore, the timings of picking up signal charges differ between the continuous exposure and instant exposure. Information discriminating between the continuous exposure and instant exposure is transmitted via one cable connecting a camera head and a camera controller, respectively of a head separate type solid state image pickup device.

In the monitor mode, prior to taking a still image, for determining a framing or in the movie mode for taking moving images, a simple and speedy image pickup method is desired even for an image pickup device of an HD-TV system.

FIGS. 3A to 3D illustrate the monitor mode (inclusive of the movie mode) using the 4 V read method. In the monitor mode, the NTSC method is desirable in order to reproduce an image easily and speedily.

FIG. 3A illustrates monitoring by the NTSC method using a monitor of 500 vertical scan lines. Image signals supplied from photodiodes A1 and A2 during the first 2 V periods form an image for the photodiodes A1 and A2. During the next 2 V periods, electric charges from photodiodes B1 and B2 are supplied to form a corresponding image.

The image 105a for the photodiodes A1 and A2 differs in position by one vertical scan line from the image 105b for the photodiodes B1 and B2. Therefore, with the 4 V read method which is used in taking a still image, a vertical jitter is produced in an image on a monitor of 500 vertical scan lines.

FIG. 3B illustrates monitoring an image using a monitor of 1000 vertical scan lines. Signals obtained by the 4 V read method are supplied to the monitor of 1000 vertical scan lines to form one frame image 106 corresponding to the electric charges of photodiodes A1, A2, B1, and B2.

It takes 4 V periods to read image signals of one frame. In reproducing one frame image by the HD-TV method, all image signals are stored temporarily to process them, thereby adding another process time. Therefore, use of a monitor of 1000 vertical scan lines poses a problem of a low motion resolution and a long processing time.

It is desirable to use a monitor of 500 vertical scan lines and the NTSC method in order to reproduce an image easily anti speedily. The methods as illustrated in FIGS. 3C and 3D have been proposed for the NTSC image reproduction by using an :image pickup device of 1000 vertical scan lines.

According to the method illustrated in FIG. 3C, accumulated electric charges are read in the similar manner used when taking a still image. However, in reproducing an image, electric charges of only photodiodes A1 and A2 are used. Namely, outputs of CCD are supplied sequentially in the order of A1, A2, B1, and B2, and these read-out image signals are written in a memory.

All image signals written in the memory are not used for monitor signals, but signals from the photodiodes A1 and A2 only are repetitively read. Specifically, when the image signal read from the photodiode A1 is written in the memory, the previously stored image information A2 is read from the memory, and when the image signal read from the photodiode A2 is written in the memory, the previously stored image information A1 is read from the memory.

During the period to be otherwise used for reading image signals B1 and B2, the image signals A2 and A1 are read from the memory. In this manner, a 500 line monitor image can be reproduced without a vertical jitter.

The above description, while an image signal for the photodiode A1 is written in the memory, signal A2 is read, and while the image signal A2 is written, signal. A1 is read. Alternatively, image signals read from the photodiodes A1 and A2 may be directly supplied to the monitor, and while image signals for the photodiodes B1 and B2 are read, the previously stored image signals A1 and A2 may be read from the memory.

This method can prevent a vertical jitter. It is however difficult to improve the motion resolution.

FIG. 3D illustrates the pixel mixed type read method. For the first field corresponding to the first V period, image signals are read from the photodiodes A1 and B1 and mixed together to generate monitor signals. For the second field corresponding to the next V period, image information is read from the photodiodes A2 and B2 and mixed together to generate monitor signals. In this manner, all pixel information is read in 2 V periods.

With this method, a vertical jitter does not occur and a monitor image of high motion resolution can be obtained. All accumulated electric charges are read in 2 V periods, so that the charge accumulation period is 2 V periods. Since the charge amount is doubled by pixel mixture, the obtained charge amount is not the same as the case where image information is read From each pixel in 4 V periods (accumulation period of 4 V) under the continuous exposure.

In reading image information through pixel mixture, electric charges accumulated in two photodiodes are mixed and transferred by HCCD. Therefore, the drive voltage of HCCD is required to have a voltage sufficient for driving two-fold saturated electric charges.

Namely, if strong light is applied, each photodiode accumulates electric charges whose amount is approximately equal to the saturated electric charges. IF these saturated electric charges are mixed together, it is necessary for HCCD to transfer electric charges two times as much as the saturated electric charges. If HCCD is driven by a drive voltage capable of transferring the saturated electric charges one photodiode, deficient charge transfer may occur to leave residue charge in the cell.

It is necessary for an HCCD drive voltage swing to be boosted two-fold for example. The doubled swing voltage and high speed charge transfer may cause a not-negligible power loss because of a not-negligible capacitance C of the CCD structure.

As described above, a 500 line monitor with a conventional 1000 line image pickup device using the NTSC method may cause a vertical jitter, a lower motion resolution, a longer process time, a power loss, and the like.

Furthermore, in taking a still image, the period required for reading images changes between 4 V periods and 5 V periods depending upon whether an instant exposure or a continuous exposure is used. In order to discriminate the exposure type, an identification signal should be supplied. For a camera head separate type solid state image pickup device, this identification signal requires one transmission cable.

SUMMARY OF THE INVENTION

It is an object of the present invention to provide an image pickup device capable of reproducing a still image of high resolution, and in the monitor mode, reproducing an image without a vertical jitter and with a high motion resolution while providing a low power loss.

It is another object of the present invention to provide a method of driving a solid state image pickup device capable of driving the image pickup device at the same timings in the still image taking mode, irrespective of the continuous mode or still image taking mode.

It is a further object of the present invention to provide a solid state image pickup device allowing such a method to be applied to it.

According to one aspect of the present invention there is provided a method of driving a solid state image pickup device, wherein electric charges accumulated in a plurality of four types of photoelectric conversion elements disposed in a matrix form on a semiconductor substrate are picked up in a plurality column of vertical CCDs each disposed in juxtaposition with each column of the photoelectric conversion elements, the electric charges in each vertical CCD are sequentially transferred to a horizontal CCD connected in common to the plurality of vertical CCD columns, and the electric charges in the horizontal CCD are sequentially transferred to read the electric charges as image signals, comprising the steps of:

accumulating electric charges by reducing the saturated electric charge amount of the photoelectric conversion elements by a half during a monitor mode;

transferring electric charges of two types of the photoelectric conversion elements at a time in the vertical CCDs during the monitor mode;

transferring the electric charges in the vertical CCDs in the vertical direction during the monitor mode;

transferring the electric charges mixed for two types of the photoelectric conversion elements in the horizontal CCD in the horizontal direction during the monitor mode; and transferring electric charges of four types of the photoelectric conversion elements one type after another at a time to the vertical CCDs during a still image taking mode.

In the monitor mode, electric charges are read from two types of photoelectric conversion elements at a time so that all electric charges can be read in 2 V periods, providing a high motion resolution.

Also in the monitor mode, the sensitivity is reduced to a half value from the reason of charge accumulation period or the like. Electric charges read from two types of photoelectric conversion elements are mixed together to make the sensitivity in the monitor mode equal to that in the still mode.

Furthermore, the saturated electric charge amount in the monitor mode is set to half that in the still mode. However, the mixed electric charges transferred in HCCD have the same saturated electric charge amount as that in the still mode. Accordingly, it is not necessary to raise the CCD drive voltage, preventing a power loss.

Since two types of mixed signals are alternately used in reproducing images, a vertical jitter will not occur.

According to another aspect of the present invention, there is provided a method of driving a solid state image pickup device, wherein electric charges accumulated in a plurality of four types of photoelectric conversion elements disposed in a matrix shape on a semiconductor substrate are picked up in a plurality column of vertical CCDs each disposed juxtaposition with each column of the photoelectric conversion elements, the electric charges in each vertical CCD are sequentially transferred to a horizontal CCD connected in common to the plurality of vertical CCD columns, and the electric charges in the horizontal CCD are sequentially transferred to read the electric charges as image signals, comprising the steps of:

executing a clear operation during $4n * V$ periods when a still image taking is designated, where n is a positive integer and V is a vertical scan period;

succeedingly sweeping out smear electric charges from the vertical CCDs during 1 V period irrespective of under a continuous exposure or under an instant exposure; and succeedingly picking up image signals during 4 V periods.

Although the amount of smear charges in CCD under the continuous exposure can be neglected, there is no practical problem even if a smear charge sweeping process is carried out. The same control timings can be used both for the continuous and still exposures, thereby dispensing with additional signal transmission between a camera head unit and camera control unit. The number of cables can thus be reduced in a head separate type solid state image pickup device.

In the monitor mode, electric charges are read from two types of photoelectric conversion elements at a time so that all electric charges can be read in 2 V periods, providing a high motion resolution.

Also in the monitor mode, although the sensitivity is reduced to a half value, electric charges read from two types of photoelectric conversion elements are mixed together to make the sensitivity in the monitor mode generally equal to that in the still mode.

Furthermore, the saturated electric charge amount in the monitor mode is set to half that in the still mode. However, the mixed electric charges transferred in HCCD have the same saturated electric charge amount as that in the still mode. Accordingly, it is not necessary to raise the CCD drive voltage, preventing a power loss.

Since two types of mixed signals are alternately used in reproducing images, a vertical jitter will not occur.

In short, in the monitor mode, although the sensitivity of photoelectric conversion cells is reduced to half that in the still mode, the sensitivity same as that in the still mode can be obtained through pixel mixture. Furthermore, the saturated electric charge amount of photoelectric conversion elements in the monitor mode is set to a half value so that the maximum charge amount to be transferred in HCCD becomes equal to that in the still mode. Accordingly, HCCD drive signals can be determined under the same conditions both for the still mode and monitor mode.

In the monitor mode, image signals are read in 2 V periods, providing a high motion resolution.

Since two types of read-out image signals have the same position, a jitter will not occur. Further, a solid state image pickup device can be driven under the same conditions irrespective of the instant or continuous exposure.

Accordingly, information discriminating between the instant exposure and continuous exposure for the determination of the start timing of reading electric charges, is not necessary to be supplied from a camera head unit to a camera control unit. The number of cables between the camera head unit and camera control unit can thus be reduced.

BRIEF DESCRIPTION OF THE DRAWINGS

FIGS. 1A to 1C show a fundamental embodiment of the present invention. FIG. 1A is a diagram briefly showing the structure of the embodiment, and FIGS. 1B and 1C are schematic diagrams illustrating the operations of reading accumulated electric charges in the monitor mode and still mode.

FIG. 2A is a plan view showing the outline of the structure, and FIGS. 2B, 2C, and 2D are diagrams conceptually illustrating the operations of reading electric charges.

FIG. 3A is a diagram briefly explaining a reproduced image on a 500 line monitor, FIG. 3B is a diagram briefly explaining a reproduced image on a 1000 line monitor, FIG. 3C is a diagram conceptually explaining duplicate reading of electric charges, and FIG. 3D is a diagram conceptually explaining a pixel mixed read method.

FIG. 5 is a block diagram showing a camera control unit of the image pickup device of the embodiment shown in FIG. 4.

FIG. 6A is a plan view showing the outline of CCD shown in FIG. 5, and FIG. 6B is a partial cross section of CCD.

DESCRIPTION OF THE PREFERRED EMBODIMENTS

Figure 2A:
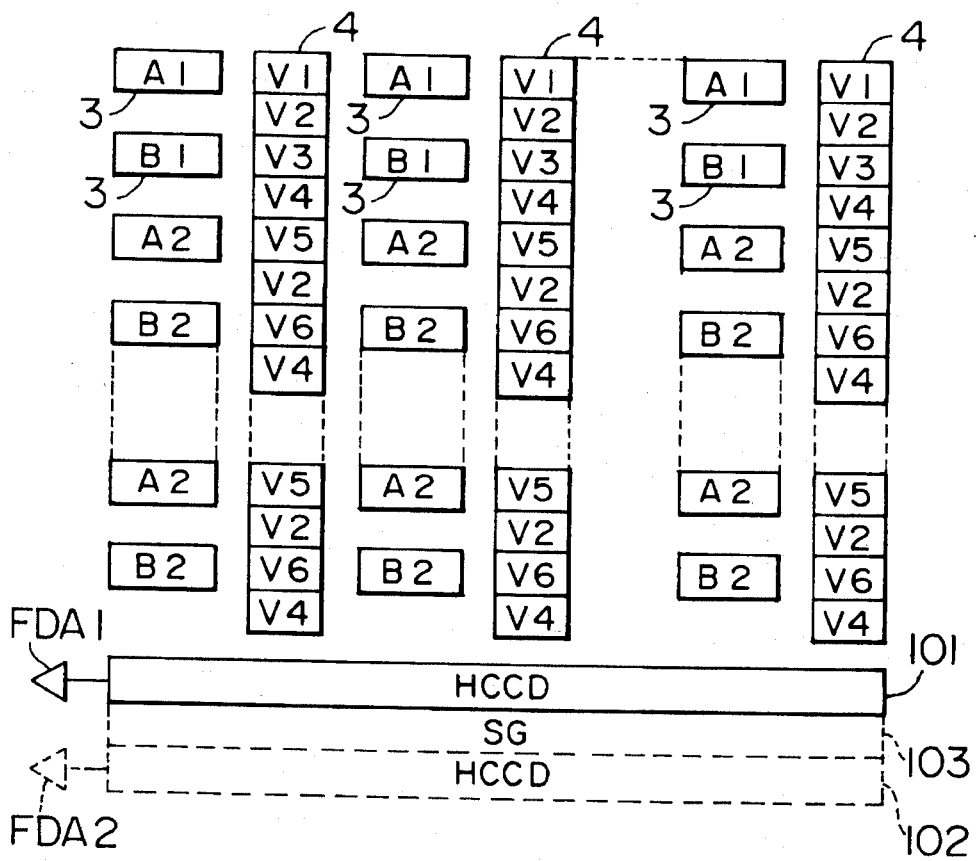
FIGS. 2A to 2D illustrate a conventional technique.
Figure 2B:
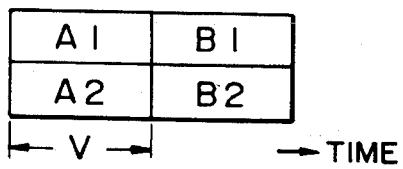
Figure 2C:
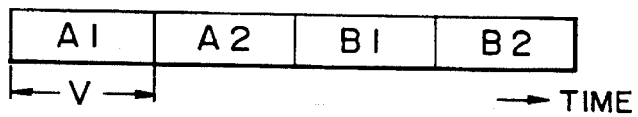
Figure 2D:
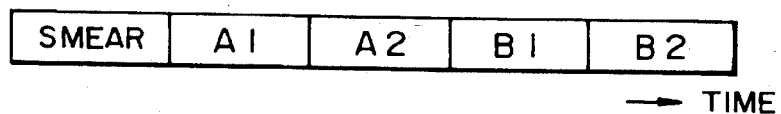
Figure 3A:
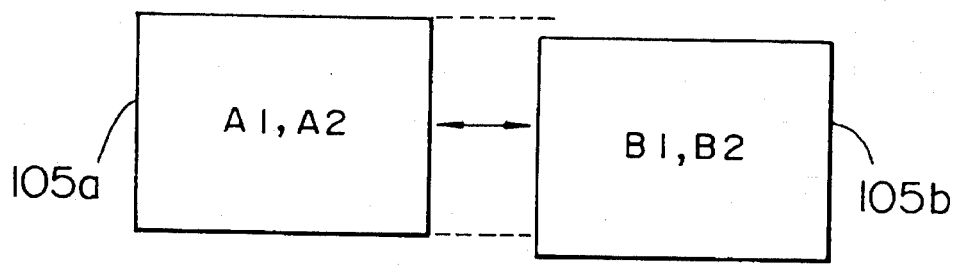
FIGS. 3A to 3D illustrate a monitor mode using a 4 V read method according to a conventional technique.
Figure 3B:
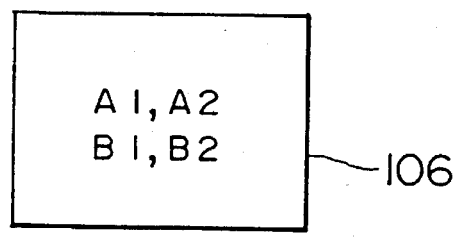
Figure 3C:
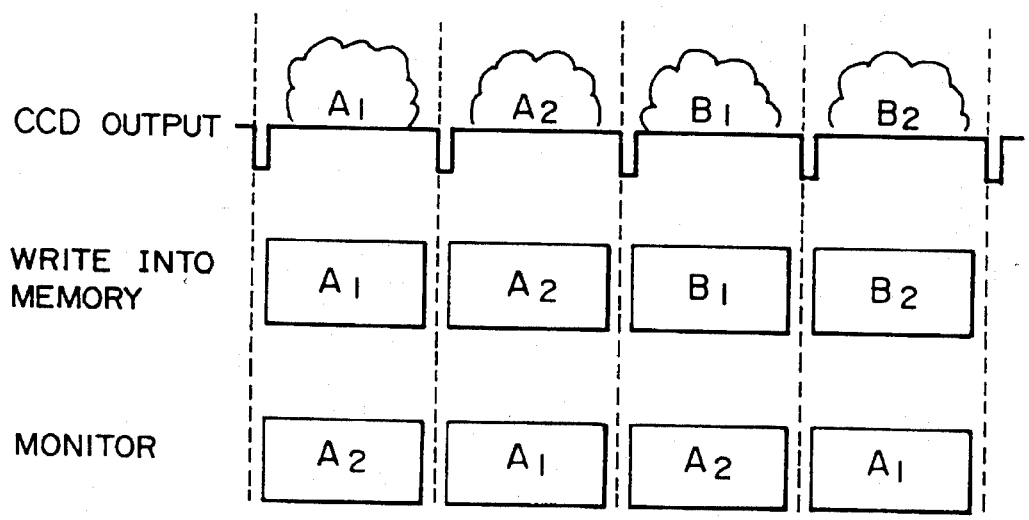
Figure 3D:
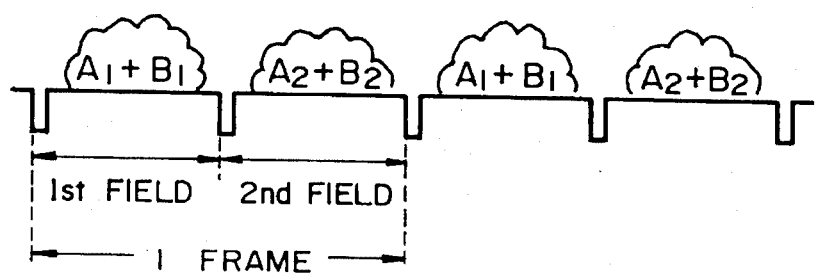

FIGS. 1A to 1C illustrate a fundamental embodiment of the present invention. FIG. 1A shows the outline of the structure of a solid state image pickup device. A number of photodiodes 3 are disposed in a matrix form. Photodiodes 3 of each column are classified into four types A1, B1, A2, and B2. VCCD 4 is provided in juxtaposition with each column of photodiodes 3. VCCD 4 has two transfer cells per one photodiode row.

HCCD 5 is coupled to the lower end of VCCD 4, and transfers electric charges transferred from VCCD in the vertical direction, in the horizontal direction.

A saturated charge amount setting unit 6 can set different saturated charge amounts to electric charges to be accumulated by each photodiode 3, for the monitor mode (inclusive of movie mode) and still mode. In the monitor mode, the saturated charge amount is set to a half of the saturated charge amount in the still mode.

A sensitivity adjusting unit 9 has an amplifier 9a with an amplification factor 1, an amplifier 9b with an amplification factor ⅖, and a switch 9c. An input signal is connected to the amplifier 9a or 9b depending upon whether a still image is taken under a continuous exposure or an instant exposure.

A smear detecting unit 7 detects the amount of smear electric charges swept out from CCD at the smear sweeping process in order to discriminate between the continuous exposure and instant exposure, this discrimination signal being supplied to the sensitivity adjusting unit 9.

FIGS. 1B and 1C illustrate briefly the operation of reading electric charges. In the monitor mode, electric charges are read from photodiodes A1 and A2 during the first V period, and during the next V period electric charges are read from photodiodes B1 and B2.

In this manner, electric charges are read from all photodiodes to all VCCDs 4 in 2 V periods. Electric charges may be read first from the photodiodes A1 and B1, and then from the photodiodes A2 and 132 during the next V period.

In the still mode, prior to reading electric charges, smear electric charges in CCD are first swept out during one V period. During the next V period, photodiodes A1 are read, and during the second next V period, photodiodes A2 are read, during the third next V period, photodiodes B1 are read, and during the fourth next V period, photodiodes B2 are read.

Two types of electric charges read in the monitor mode have half the saturated electric charge in the still mode. Therefore, the amount of mixed saturated electric charges is the same as in the still mode.

The amount of saturated electric charges to be transferred in HCCD is therefore the same both in taking a image and in monitoring images. It is not necessary to use a high drive voltage For HCCD 5, thereby preventing a power loss. This is also true for VCCD which performs charge mixture.

Although the sensitivity in the monitor mode is half that when taking a still image, both the sensitivities are made equal because of a provision of pixel mixture.

Since a monitor image is formed using two types of mixed electric charges, a vertical jitter will not occur. Furthermore, one frame image is formed in 2 V periods, maintaining the motion resolution high.

If a smear sweeping process is executed prior to reading image signals under the continuous exposure, the charge accumulation period of photodiodes becomes 5 V. The charge accumulation period in the monitor mode is 2 V, and the sensitivity is proportional to 2 V * 2 because of charge mixture. In the still mode under the continuous exposure, the sensitivity is proportional to 5 V, thus producing a sensitivity difference therebetween.

For the instant exposure, even if 1 V for the smear sweeping process is inserted, the total amount of accumulated electric charges will not increase, and so the sensitivity will remain proportional to 4 V. If an electronic flash or the like which can set the sensitivity under the instant exposure to a value proportional to 5 V, then the sensitivity can be made equal to that under the continuous exposure.

The smear detecting unit 7 and sensitivity adjusting unit 9 shown in FIG. 1A operate to compensate for a difference between sensitivities under the continuous exposure and instant exposure. Specifically, under the continuous exposure, the detected charge signal is multiplied by ⅘ to lower the sensitivity to have a value proportional to 5 V * (⅘)=4 V.

In this manner, the sensitivity in the still mode under the continuous exposure is made equal to those in the monitor mode and in the still mode under the instant exposure.

Since the sensitivity adjusting unit 9 and smear detecting unit 7 can be mounted on a camera control unit, it is not necessary to transmit, from a camera head unit to the camera controller, the information representing which of the instant exposure and continuous exposure is to be selected. The number of signal transmitting cables can thus be reduced.

More specific embodiments of the present invention will be described.

Figure 4:
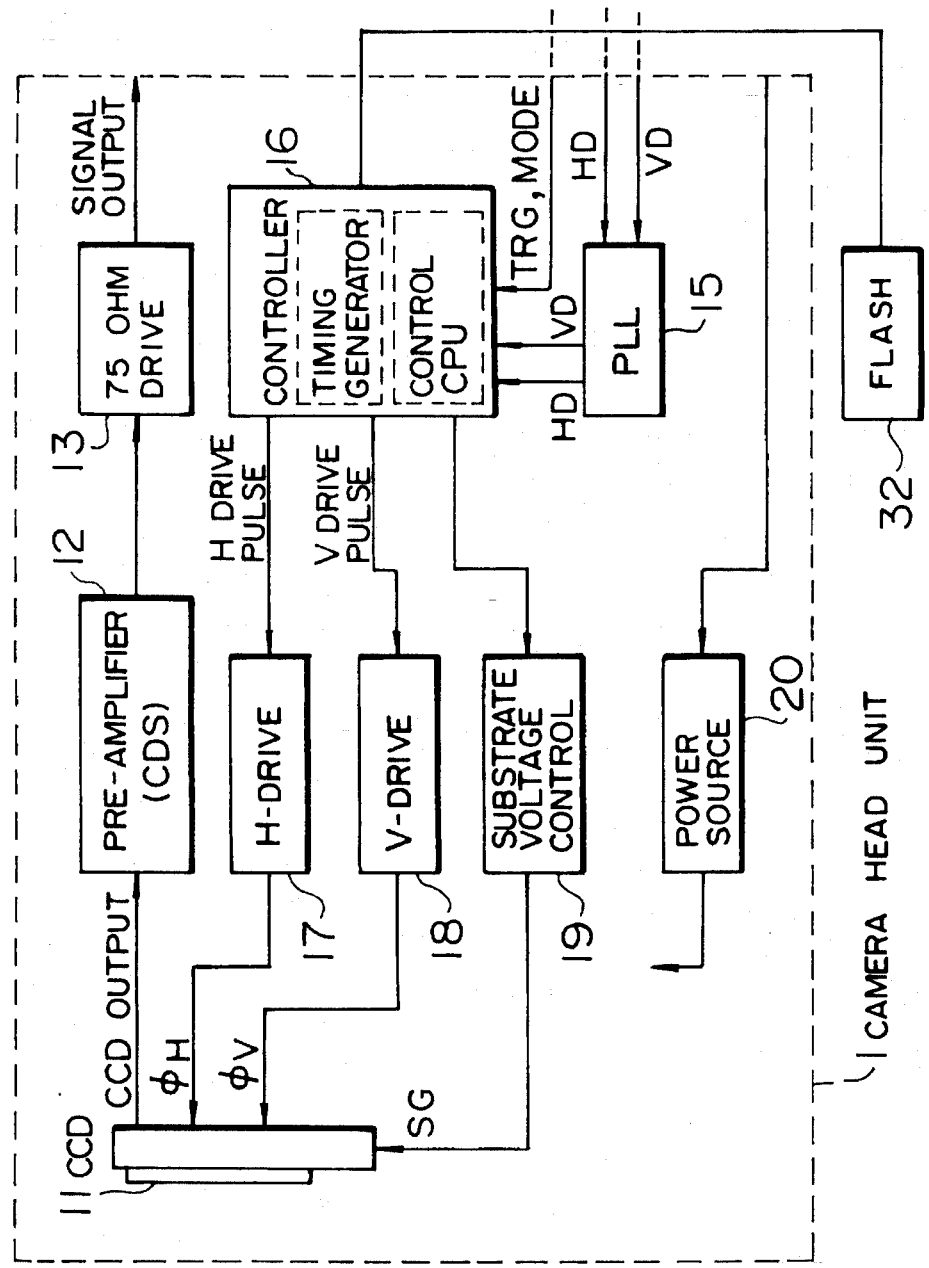
FIG. 4 is a block diagram showing a camera head unit of an image pickup device according to an embodiment of the present invention.

FIG. 4 is a block diagram showing a camera head unit of an image pickup device according to an embodiment of the present invention.

The camera head unit 1 has a CCD image pickup device 11, a pre-amplifier 12 of a correlation dual sampling type for amplifying an output signal from the CCD image pickup device while reducing its noises, and a 75 ohm driver 13 for supplying an output of the pre-amplifier 12 to a camera control unit shown in FIG. 5.

The camera head unit 1 includes a PLL circuit 15, a controller 16, a horizontal drive circuit 17, a vertical drive circuit 18, and a substrate voltage control circuit 19. The PLL circuit 15 receives a horizontal drive signal HD and vertical drive signal VD from the camera control unit 2 shown in FIG. 5, and generates synchronizing signals. The controller 16 receives synchronizing signals HD and VD, a mode select signal MODE and trigger signal TRG from the camera control unit 2, and generates a horizontal drive pulse, vertical drive pulse, and a shift gate signal. The horizontal drive circuit 17 receives the horizontal drive pulse and generates a horizontal drive signal for driving HCCD. The vertical drive circuit 18 receives the vertical drive pulse and generates a vertical drive signal for driving VCCD. The substrate voltage control circuit 19 changes and sets a substrate bias in response to a mode signal. An electronic flash lamp 32 is connected to a timing generator in the controller 16.

The controller 16 has the timing generator, a control CPU, and the like. The camera head unit 1 also has a power source unit 20 for supplying power to all circuits of the unit 20.

FIG. 5 is a block diagram of the camera unit 2. An output signal from the camera head unit 1 is supplied to a gain control amplifier 21, and amplified by a preset amplification factor. An output of the gain control amplifier 21 is supplied via the sensitivity adjusting unit 9 and gamma correction circuit 22 to an A/D converter 23 to be converted into a digital signal which is then supplied to a memory unit 24.

The memory unit 24 stores supplied digital signals. Image signals read from the memory unit 24 are converted into analog signals by a D/A converter 25 and outputted therefrom.

Charge signals amplified by the gain control amplifier 21 are also supplied to the smear detecting unit 7. The smear detecting unit 7 detects smear electric charges in response to a predetermined timing signal from a timing generator 29 to be later described. It is possible to discriminate between the continuous exposure and instant exposure depending upon the amount of smear electric charges. A smear signal detected by the smear detecting unit 7 is supplied to CPU 28 to be later described.

The main CPU 28 discriminates between the continuous exposure and instant exposure depending upon the smear signal. A discrimination signal is supplied to the sensitivity adjusting unit 9 to activate the switch 9c.

An output signal from the gain control amplifier 21 passes through either the amplifier 9b or 9a of the sensitivity adjusting unit 9 depending upon the continuous exposure or instant exposure, and is supplied to the gamma correction circuit 22. Therefore, the charge signal inputted to the gamma correction circuit 22 has already been adjusted in its amplitude.

The timing generator 29 generates the horizontal drive pulse HD, vertical drive pulse VD and other control signals at predetermined timings, some of these controls signals being supplied to the main CPU 28 and gamma correction circuit 22.

The main CPU 28 receives a switch signal via an external switch SW 32, and supplies the trigger signal TRG to a memory controller 27 and to the camera head unit. In response to an on/off of the trigger signal, an indication of the still mode/monitor mode is displayed.

The memory controller 27 receives the trigger signal and changes the bank switch mode when image signals are stored in the memory unit 24. The memory controller 27 also receives the mode signal MODE and changes a memory bank switch mode when image signals are stored in the memory unit 24. The main CPU 28 supplies a gain switch signal to the gain control amplifier 21 to set a predetermined gain in accordance with the operation mode. A power source unit 30 supplies power to all circuits of the camera control unit 2.

In the circuits shown in FIGS. 4 and 5, for the operation of taking a still image, image signals accumulated the CCD device 11 are read in 4 V periods after smear electric charges were swept out in 1 V period, and then stored in the memory unit 24.

During the monitor mode, the substrate voltage is changed so that the saturated electric charge amount of photodiodes is halved. Two types of electric charges accumulated in the CCD device 11 are read at the same time and mixed to be supplied as CCD outputs which are displayed on the monitor 31.

Each circuit portion of the image pickup device shown in FIGS. 4 and 5 will be described in more detail.

Figure 6A:
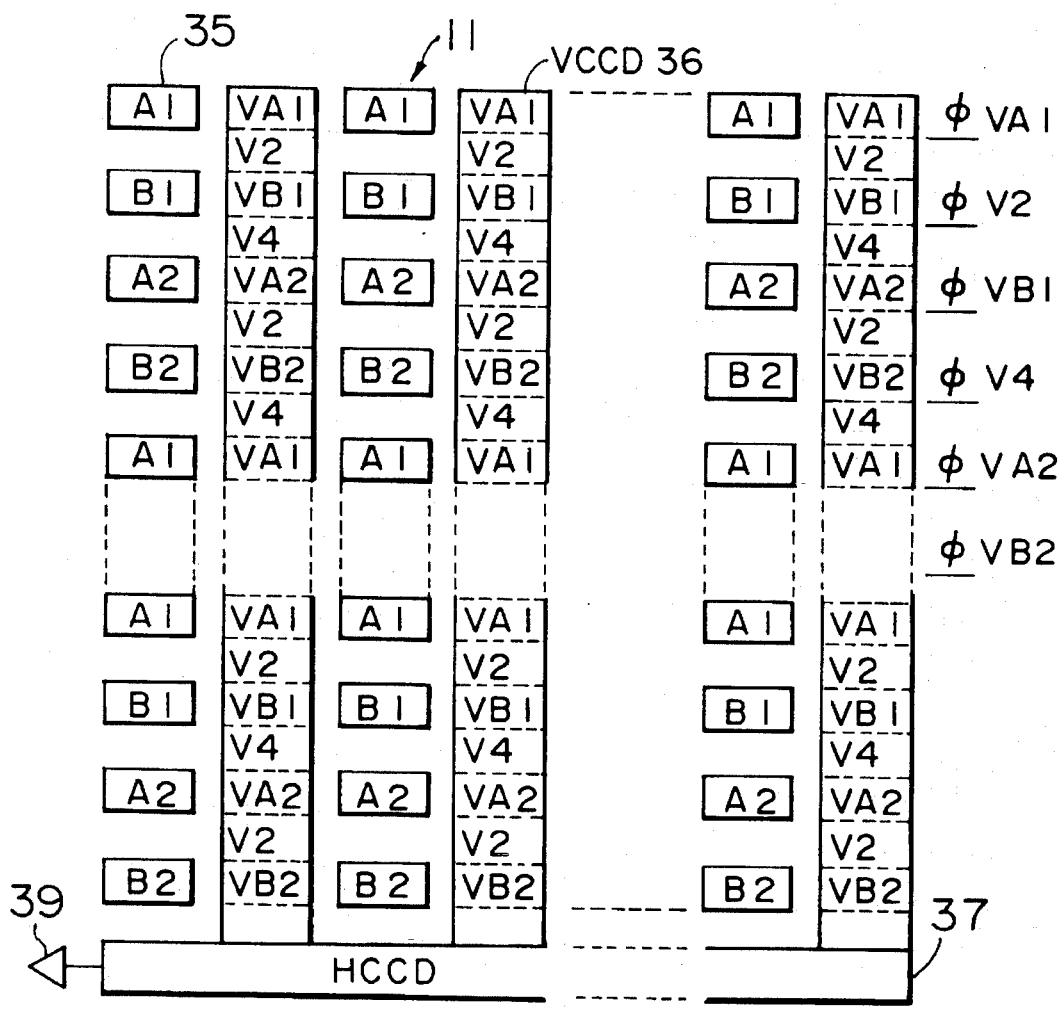
FIG. 6A and 6B show the structure of CCD of FIG. 5 in more detail.
Figure 6B:
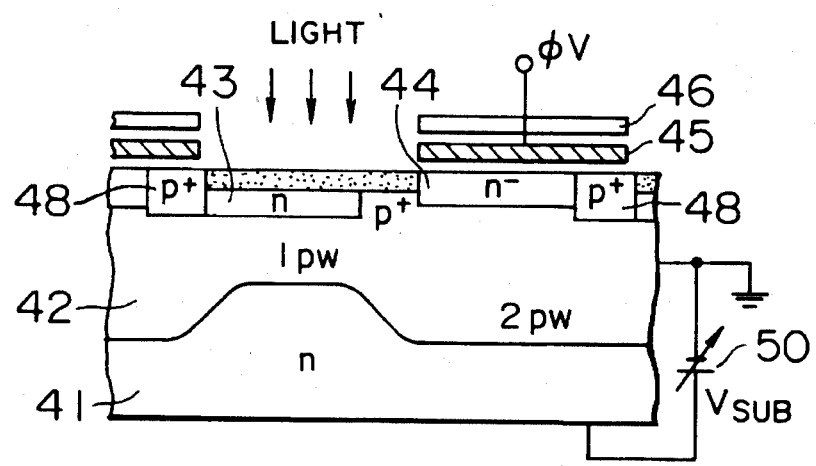

FIGS. 6A and 6B illustrate the structure of a CCD.

FIG. 6A is a plan view, and FIG. 6B is a partial cross section. In FIG. 6A, a CCD 11 has photodiodes 35 disposed in a matrix Form, and a plurality of VCCDs 36 for picking up electric charges from the photodiodes 35 and transferring them in the vertical direction, and an HCCD 37 for transferring electric charges from VCCDs 36 in the horizontal direction.

Photodiodes 35 of each column are classified into four types A1, B1, A2, and B2 in the descending order in each column as shown in FIG. 6A. One field image corresponds to photodiodes of each type. In juxtaposition with each photodiode column, each VCCD 36 is provided which has two transfer cells per one row. VCCD 36 transfers electric charges by 6-phase drive signals mVA1, mV2, mVB1, mV4, mVA2, and mVB2.

A plurality of VCCDs 36 are connected at their one ends to HCCD 37. Specifically, electric charges picked up From the photodiodes 35 to VCCDs 36 are transferred in the vertical direction and to HCCD 37 in the horizontal direction. HCCD 37 is driven by using 4-phase drive signals mH1, mH2, mH3, and mH4. An output from HCCD 37 is supplied to an amplifier 39 and outputted therefrom.

FIG. 6B shows the structure of a photodiode formed on the surface of a substrate and a vertical type overflow drain formed under the photodiode. Formed on the surface of an n-type semiconductor substrate 41 is a p-well 42 made of a shallow first p-well 1pw and a deep second p-well 2pw.

An n-type region 43 is formed above the first p-well 1pw to form a photodiode. An n⁻region 44 is formed near the n-type region 43 spaced apart by a predetermined distance, this region 44 forming a charge transfer channel of VCCD. A p⁺region 48 serves as a channel stop region. An insulated electrode 45 and light shielding mask 46 are formed above the n⁻region 44 forming the charge transfer channel. Light is incident to the n-type region 43 forming the photodiode. Applied between the p-well region 42 and n-type substrate 41 is an inverse bias voltage supplied from a variable d.c. power 50 source controlled by a substrate voltage control circuit 19 shown in FIG. 4.

Electrons of excessive electric charges, duet to incident light overflow from the n-type region 43 to the n-type substrate 41. As the substrate voltage is changed, the overflow potential changes and the saturated electric charge amount of the photodiode changes. In the monitor mode, the substrate voltage is set so that the saturated electric charge amount becomes half that in the still mode. Electric charges overflowing the photodiode are swept out into the substrate 41.

Figure 7:
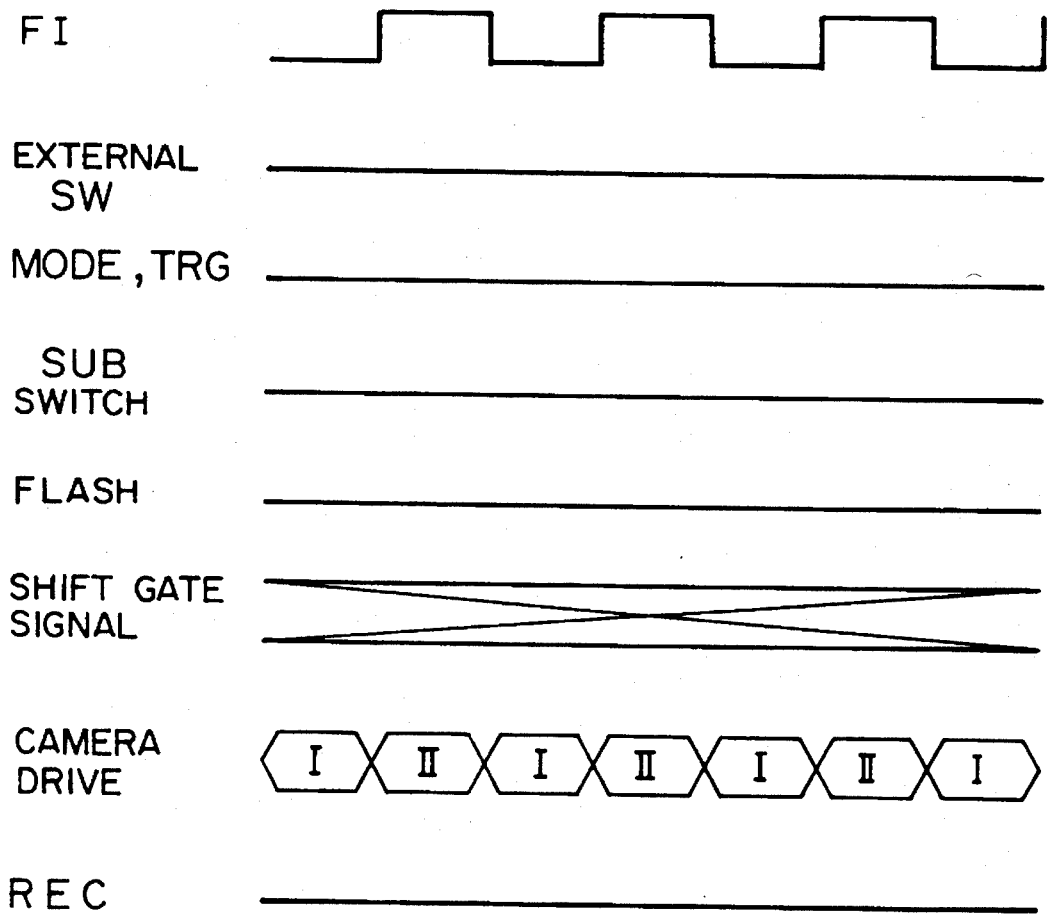
FIG. 7 shows waveforms of control signals used in the monitor mode.

FIG. 7 is a timing chart of control signals used during the monitor mode for monitoring an image and determining a framing. A field switch signal F1 has a pulse waveform alternately changing its polarity at each field. An external switch signal always takes a value "0" during the monitor mode since the shutter is not being fully depressed.

A mode signal MODE and trigger signal TRG take "0" during the monitor mode, and "1" during the still mode. A SUB switch signal takes "0" during the monitor mode, and "1" during the still mode. An electronic flash signal takes "0" while the flash lamp is not operated.

During the monitor mode, electric charges for all pixels are read in 2 V periods, the camera drive signal switches alternately between field I and field II. During the monitor mode, a record signal REC takes "0" because images are not recorded.

Figure 8:
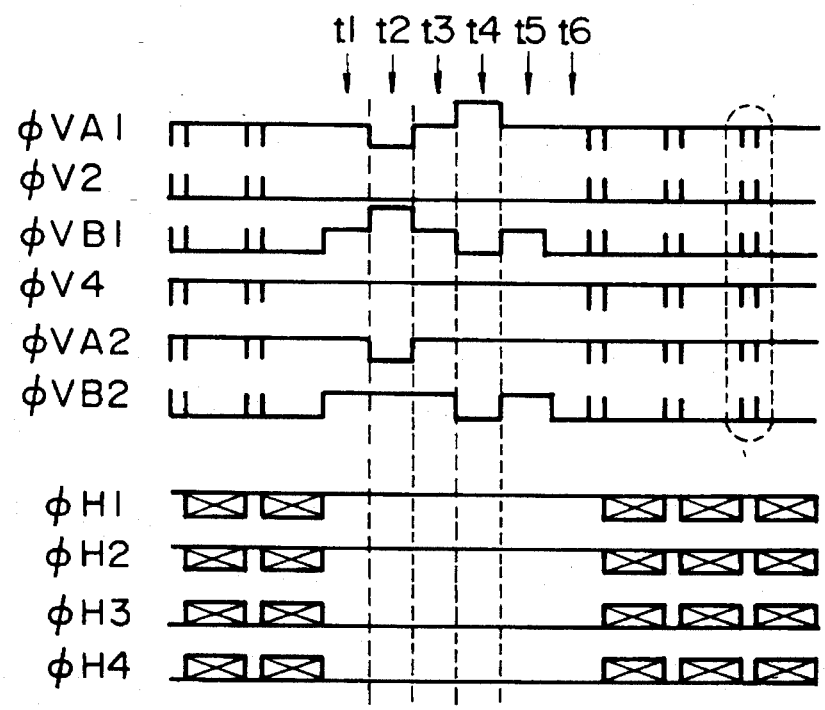
FIG. 8 shows waveforms explaining image signal pickup the monitor mode.

FIG. 8 shows waveforms of drive signals for picking up image signals of field I. When the voltage of a transfer cell contiguous to a photodiode of VCCD is set to a predetermined value, accumulated electric charges in the photodiode are picked up by VCCD.

Drive signals of 5-phase for VCCD are shown at the upper half of FIG. 8. When the drive signal mVB1 takes a high level at time t2, accumulated electric charges are transferred from the photodiode B1 to VCCD. When the drive signal mVA1 takes a high level at time t4, accumulated electric charges are picked up from the photodiode A1.

Namely, electric charges of two types of the photodiodes A1 and B1 are picked up by VCCD in 1 V period, and sequentially transferred in the vertical direction during each horizontal blanking period. The electric charges of the two types are mixed and transferred in HCCD at a high speed during the next horizontal scan period.

Figure 9:
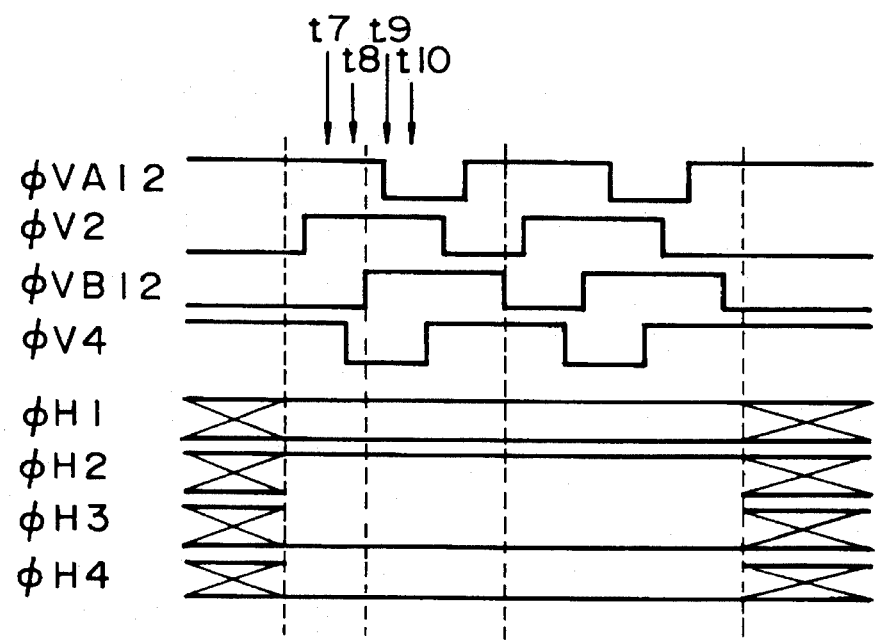
FIG. 9 shows waveforms explaining image data transfer in the monitor mode.

FIG. 9 is an enlarged view of the waveforms encircled by a broken line in FIG. 8. The VCCD drive signals mVA1, mVA2, mV2, mVB1, mVB2, and mV4 change as shown in FIG. 9 to transfer electric charges in VCCD in the vertical direction.

Figure 11:
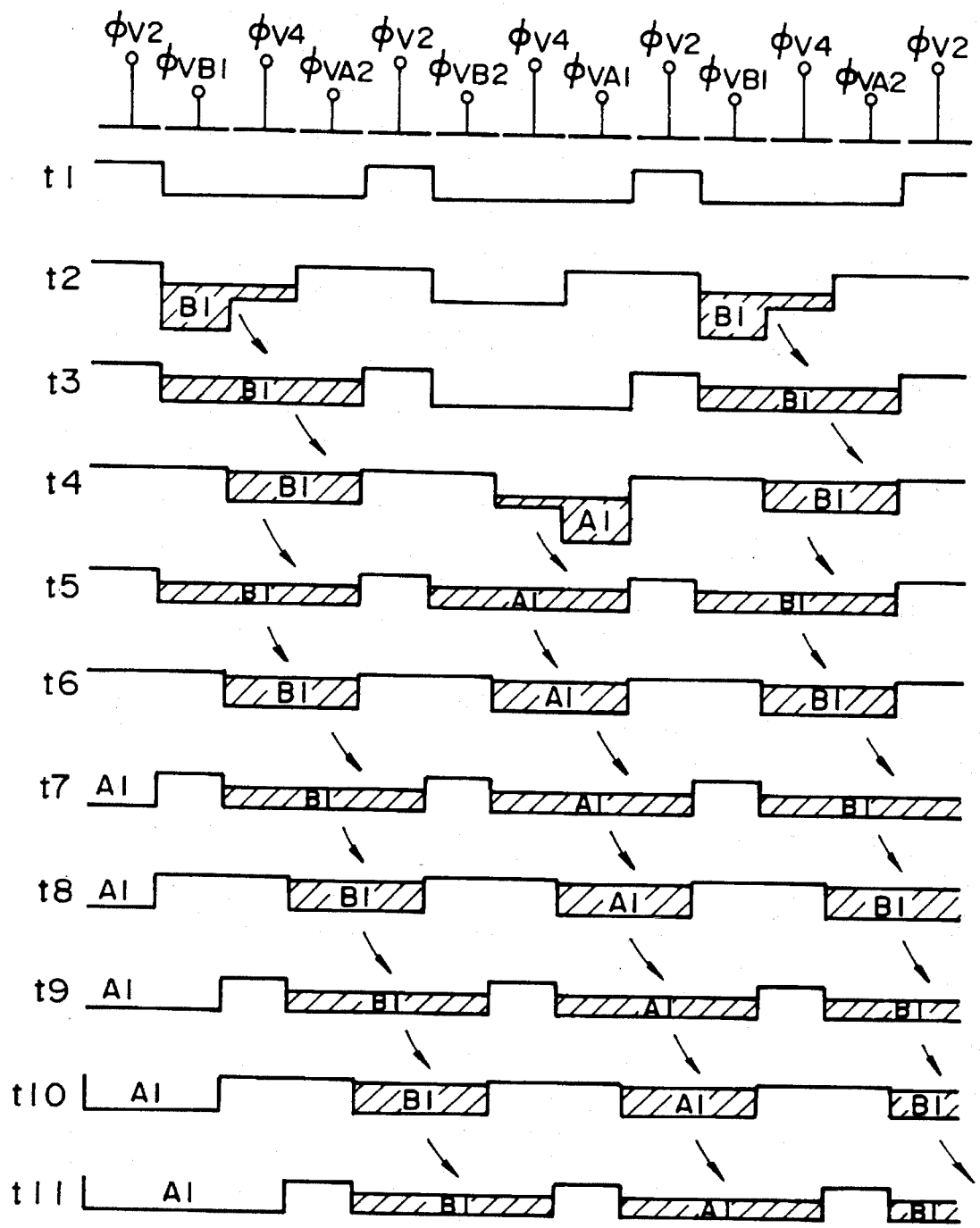
FIG. 11 is a potential diagram explaining image data pickup and transfer at VCCD in the monitor mode.

Potentials of VCCD at times t1 to t1.0 shown in FIGS. 8 and 9 are given in FIG. 11.

Referring to FIG. 11, when the drive voltage mVB1 takes a high level at time t2, electric charges are picked up from the photodiode B1 to VCCD. The picked-up electric charges have been transferred by one transfer cell to the right side in FIG. 11 until time t4. At this time t4 the drive voltage mVA1 takes a high level so that electric charges of the photodiode A1 are picked up by VCCD.

At the next time t5, the picked-up electric charges extend and distribute by three transfer cells, leaving one cell barrier between respective electric charges. Electric charges picked up at times t6 to t11 are transferred to the right in FIG. 11, by repeating the operations of contracting by one cell at the back side of electric charges and extending by one cell at the front side of the electric charges, in other words by the motion like a measuring worm. Two types of electric charges are mixed at HCCD.

Figure 10:
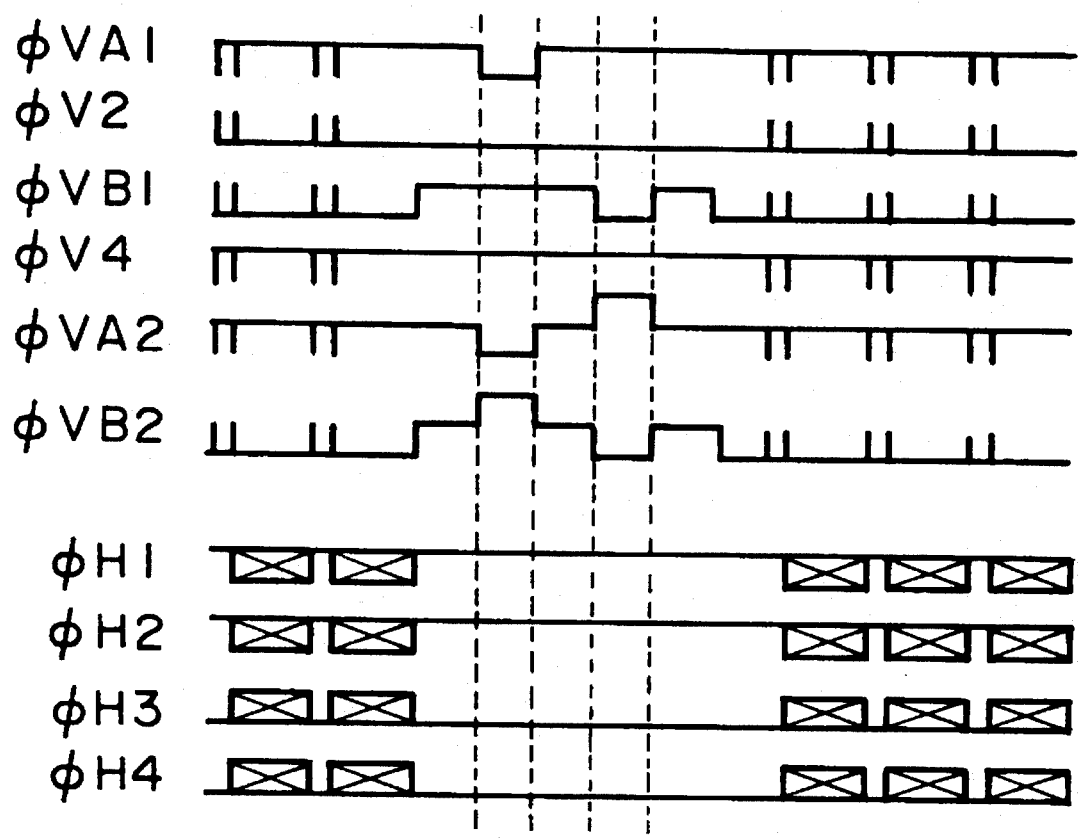
FIG. 10 shows waveforms explaining control signals for other fields in the monitor mode.

Driving of field I for picking up electric charges from the photodiodes A1 and B1 has been described above. Similar charge pickup and transfer are executed for field II. FIG. 10 shows waveforms of control signals to be used for reading image data for field II.

Figure 12:
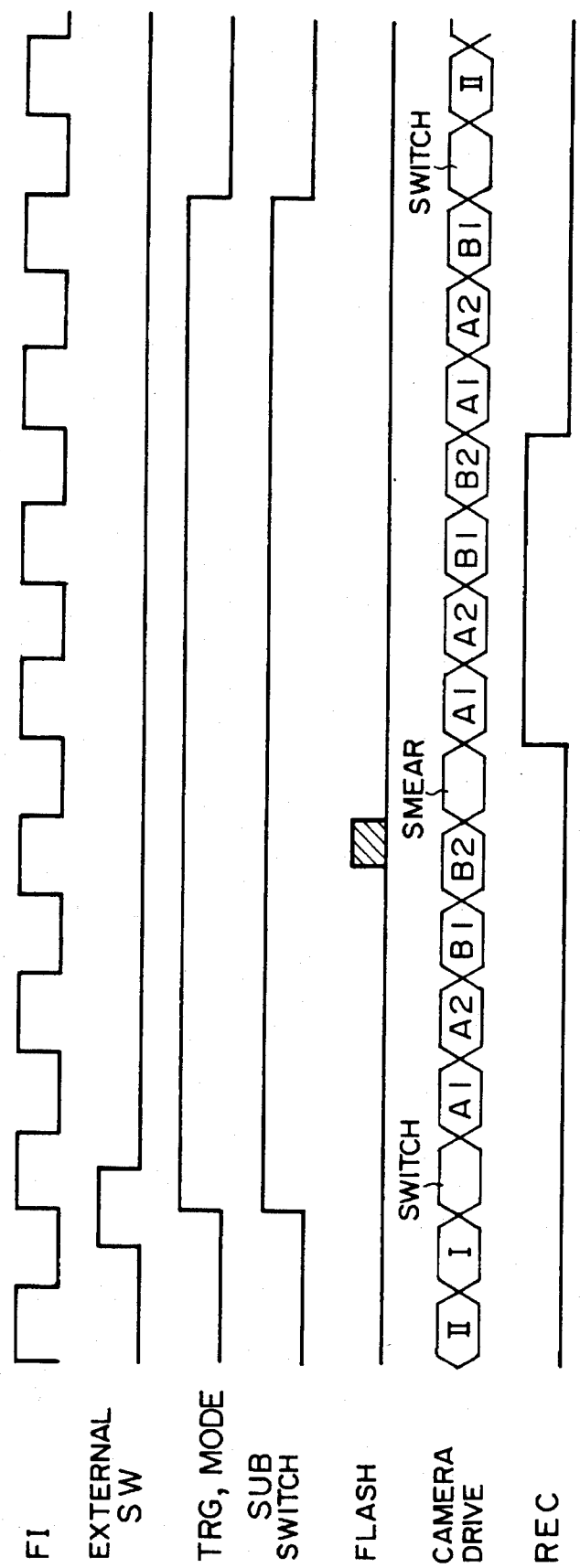
FIG. 12 shows waveforms of control signals used in the still mode.

FIG. 12 shows waveforms of control signals when a shutter Is activated to take a still image and the external switch 32 shown in FIG. 5 is turned on. The external switch 32 generates an external switch signal which takes "1" for a predetermined period. When the external switch signal changes from "0" to "1", the trigger signal TRG rises at the next field following the rise of the external switch signal, to perform a mode change for changing camera drive signals. This mode change is completed in 1 V period. Simultaneously with the start of the mode change, the mode signal rises to display a still mode indication.

At the same time when the mode signal rises, the substrate voltage SUB switch signal also rises. In response to this, the variable d.c. substrate voltage power source 50 shown in FIG. 6B is controlled by the substrate voltage controller 19 shown in FIG. 4. In the still mode reading one type of photodiodes, the saturated electric charge amount is half that in the monitor mode reading two types of photodiodes. In view of this, the difference between saturated electric charge amounts is adjusted by changing the substrate voltage.

After completion of the mode change, electric charges in CCD are swept out or cleared at least during 4 V periods (or 4n V periods, where n is a positive integer). In the example shown in FIG. 12, after the charge clear operation, smear electric charges are swept in 1 V period, and thereafter the record mode starts. In the record mode, electric charges are sequentially read from the photodiodes A1, A2, B1, and B2 in 4 V periods in response to the record signal REC and stored in the memory.

Namely, this charge signal read/write operation starts from the seventh V period counted from the rise of the trigger signal TRG. For the clear operation of 4n V periods, it starts from the (4n+3)-th V period.

When the electronic flash lamp or shutter is activated, a flash operation starts immediately before the smear electric charge sweeping process.

Figure 13:
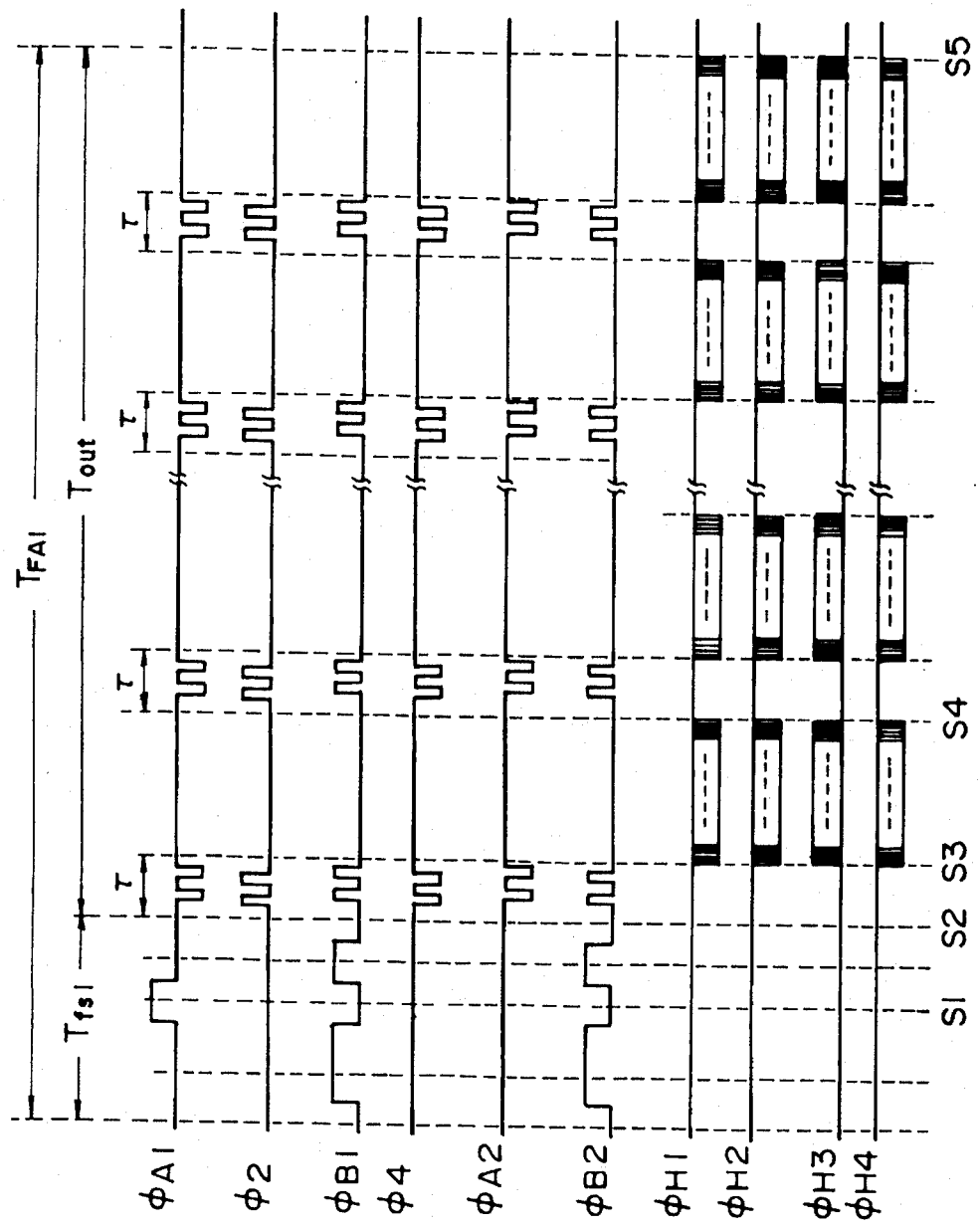
FIG. 13 shows waveforms of drive signals for an A1 field in the still mode.

FIG. 13 shows waveforms of drive signals used for reading electric charges of photodiodes A1 during the first V period. When the drive signal real takes a high level at time S1, electric charges are picked up from the photodiodes A1 to VCCD, and thereafter transferred in VCCD in the vertical direction during each horizontal blanking period.

Figure 14:
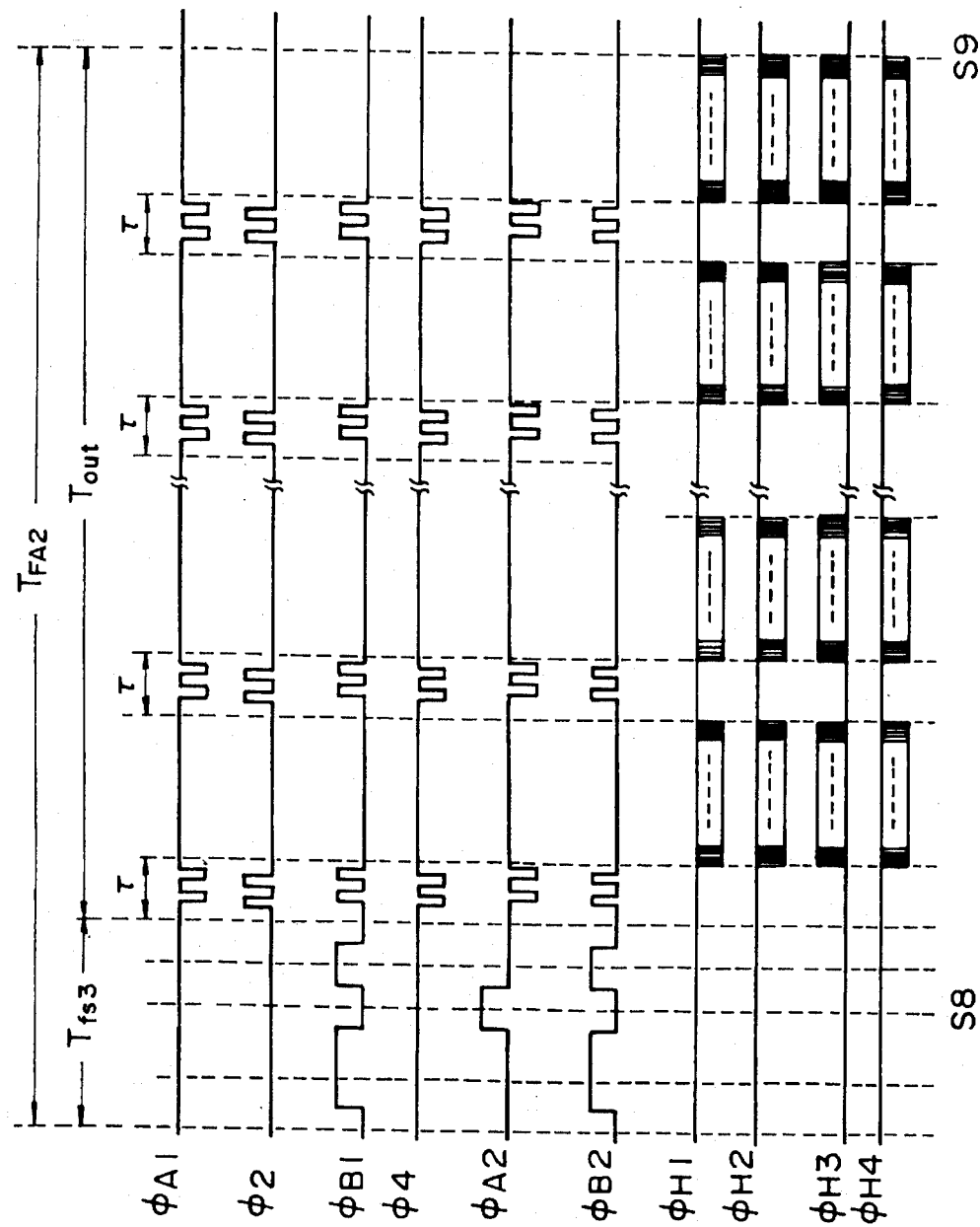
FIG. 14 shows waveforms of drive signals for an A2 field in the still mode.

FIG. 14 shows control signals used for reading photodiodes A2 field. When the drive signal mA2 takes a high level at time S8, electric charges are picked up from the photodiodes A2 by VCCD, and transferred in VCCD in the vertical direction during each horizontal blanking period. During the horizontal scan period, the electric charges in VCCD stop, and the electric charges in HCCD are transferred at a high speed in the horizontal direction.

Figure 15:
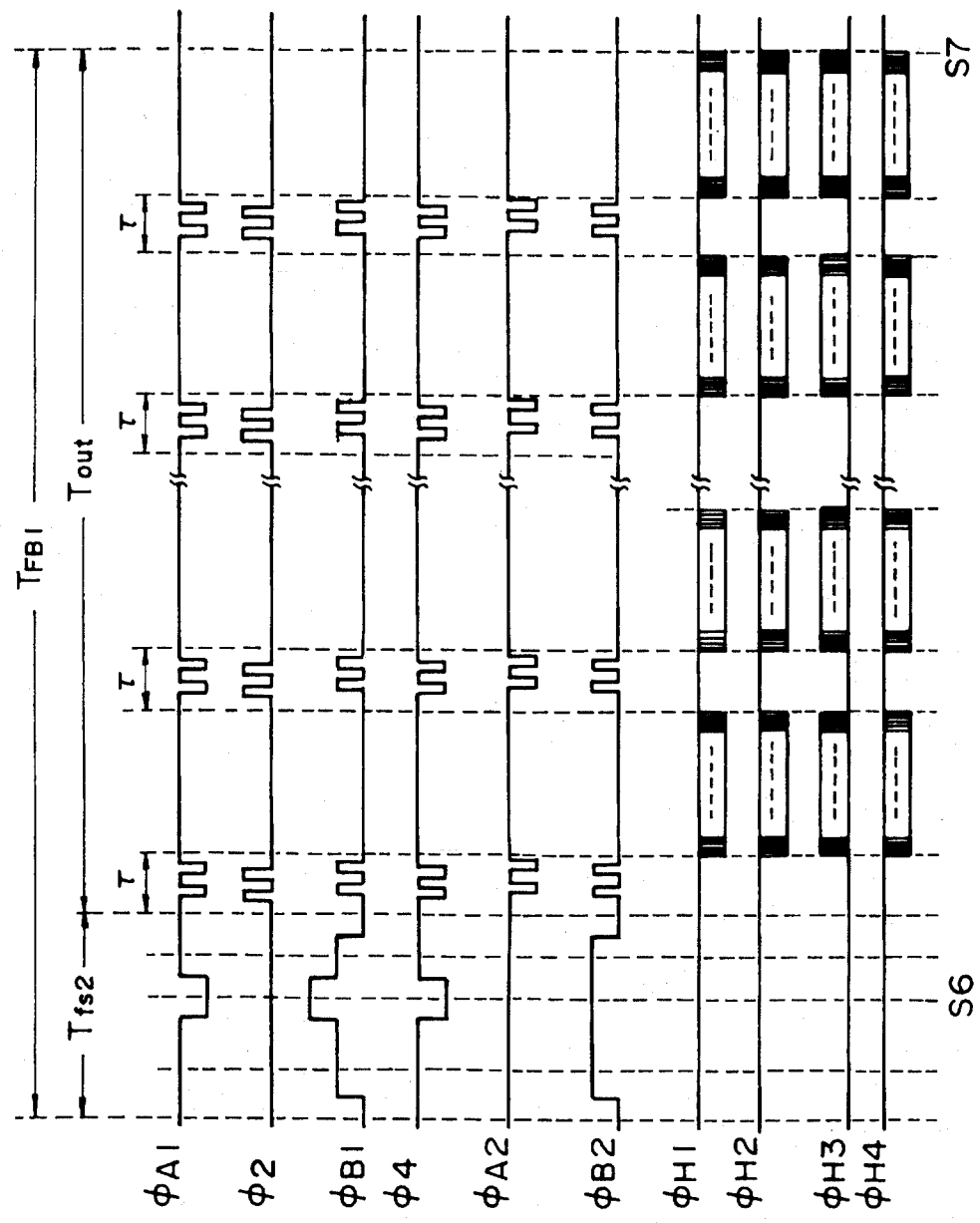
FIG. 15 shows waveforms of drive signals for an B1 field in the still mode.
Figure 16:
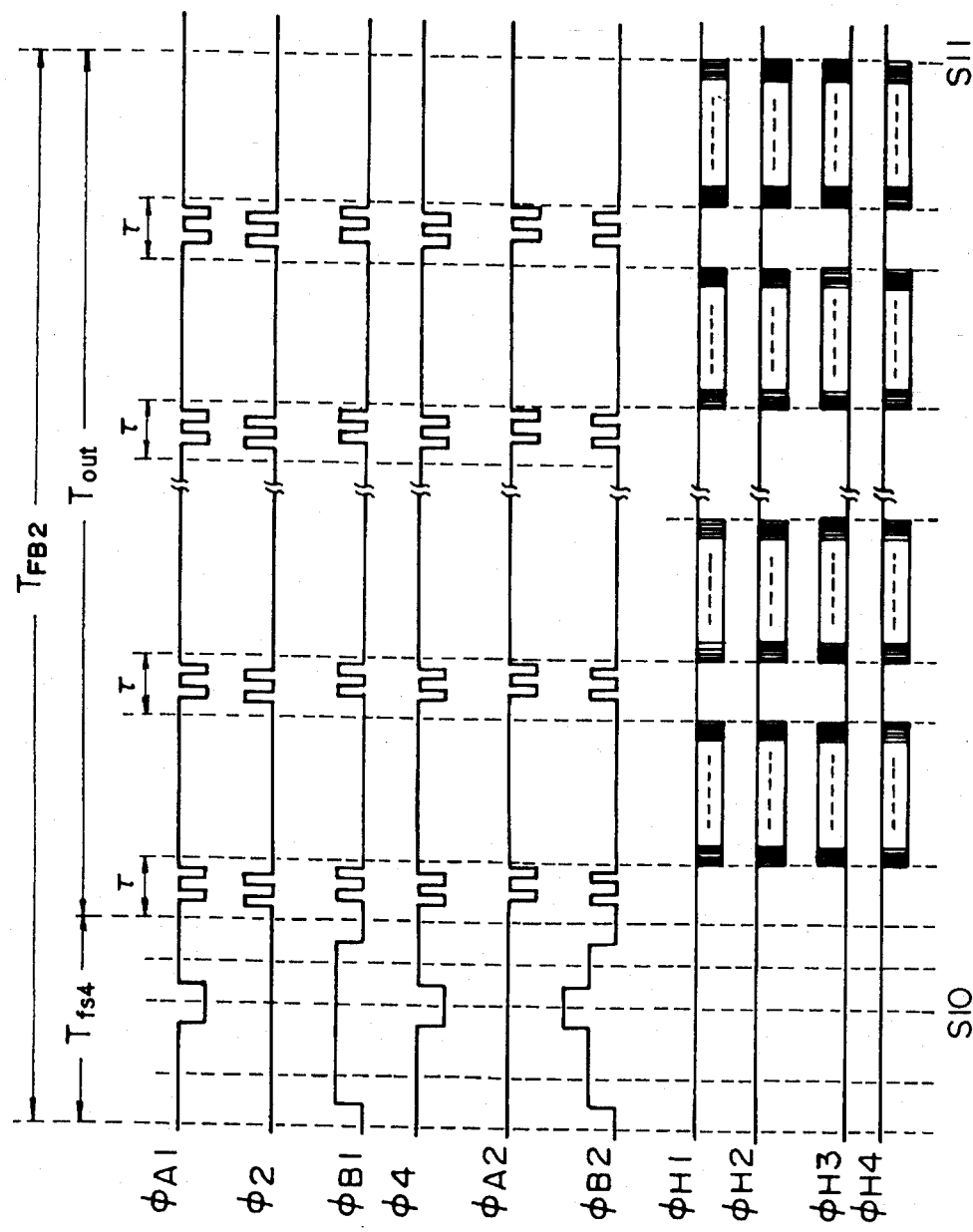
FIG. 16 shows waveforms of drive signals for an B2 field in the still mode.

FIGS. 15 and 16 show waveforms of drive signals used for reading electric charges from photodiodes B1 and B2 fields, respectively. In FIG. 15, when the drive signal mB1 takes a high level at time S6, accumulated electric charges in the photodiodes B1 are picked up. In FIG. 16, when the drive signal mB2 takes a high level at time S10, accumulated electric charges are picked tip from the photodiodes B2 to VCCD. These electric charges are transferred in the similar manner described above.

As described so far, in the monitor mode, the substrate bias is controlled so that the saturated electric charge amount is approximately halved as compared with that in the still mode. Accordingly, the maximum electric charge amount in the monitor mode with two-pixel mixture can be made generally equal to that in the still mode, thereby providing an improved charge transfer in CCD.

In the still mode, a smear electric charge sweeping process for one V period is provided irrespective of the instant or continuous exposure. Therefore, smear components of an image can be effectively eliminated. Since the period for reading one frame becomes 5 V periods, the sensitivity under the continuous exposure is reduced by about ⅘. Accordingly, approximately the same sensitivity can be obtained for both the continuous and still exposures.

The present invention has been described in connection with the preferred embodiments. The present invention is not limited to the above embodiments only.

I claim:

1. A solid state image pickup device comprising:
   a number of four types of photoelectric conversion elements disposed in a matrix shape;
   a plurality of columns of vertical CCDs each disposed in juxtaposition with each column of said photoelectric conversion elements;
   a horizontal CCD connected in common to one end of each of said plurality of columns of vertical CCDs; and
   saturated electric charge amount setting means for setting the saturated electric charge amount of said photoelectric conversion elements in a monitor mode to a value approximately half the saturated electric charge amount in a still mode, wherein, during said monitor mode, two types of said photoelectric conversion elements transfer electric charges to said vertical CCDs and, during said still mode, one type of said photoelectric conversion elements transfers electric charges to said vertical CCDs.

2. A solid state image pickup device according to claim 1, wherein said photoelectric conversion elements include photodiodes and a substrate region forming bipolar transistors in combination with said photodiodes, and said saturated electric charge amount setting means includes substrate bias changing means for changing a bias voltage to be applied between said photodiodes and said substrate region.

3. A method of driving a solid state image pickup device, comprising the steps of:
   in a monitor mode,
   setting a saturated electric charge amount of a plurality of first, second, third, and fourth types of photoelectric conversion elements disposed in matrix form on a semiconductor substrate to one half a saturated electric charge amount during a still mode;
   storing electric charges in said plurality of first, second, third, and fourth types of photoelectric conversion elements;
   transferring electric charges in said first and second types of photoelectric conversion elements into vertical CCDs of a plurality of columns of vertical CCDs, each column of vertical CCDs disposed in juxtaposition and associated with a column of said photoelectric conversion elements;
   mixing said electric charges from said first and second types of photoelectric conversion elements in said plurality of columns of vertical CCDs;
   transferring said mixed electric charges from said first and second types of photoelectric conversion elements in said vertical CCDs in a vertical direction to a horizontal CCD connected in common to said plurality of columns of vertical CCDs;
   transferring said mixed electric charges from said first and second types of photoelectric conversion elements in said horizontal CCD in a horizontal direction; and
   in said still mode,
   storing electric charges in said plurality of first, second, third, and fourth types of photoelectric conversion elements;
   transferring electric charges in said first type of photoelectric conversion elements into vertical CCDs of said plurality of columns of vertical CCDs;
   transferring said electric charges from said first type of photoeletric conversion elements in said vertical CCDs in a vertical direction to said horizontal CCD; and
   transferring said electric charges from said first type of photoelectric conversion elements in said horizontal CCD in a horizontal direction.

4. A method according to claim 3, wherein said setting step includes the step of adjusting a voltage applied to said semiconductor substrate to set said saturated electric charge amount during said monitor mode to one half said saturated electric charge amount during said still mode.

5. A method according to claim 3, further comprising the step of adjusting a voltage applied to said semiconductor substrate so as to set said saturated electric charge amount to said saturated electric charge amount during said still mode upon entering said still mode after said monitor mode.

6. A method according to claim 3, further comprising the step in the still mode of:
   clearing electric charges from said photoelectric conversion elements during 4n * V periods, where n is a positive integer and V is a vertical scan period.

7. A method according to claim 6, further comprising the step in the still mode of:
   sweeping out smear electric charges from said vertical CCDs during a 1 V period following said clearing step.

8. A method according to claim 7, further comprising the step in the still mode of:
   reading out electric charges, following said sweeping out step, in said first, second, third and fourth types of photoelectric conversion elements during consecutive 1 V periods, respectively, so that electric charges in said first type of photoelectric conversion elements are read out during a first 1 V period, electric charges in said second type of photoelectric conversion elements are read out during a second 1 V period, electric charges in said third type of photoelectric conversion elements are read out during a third 1 V period, and electric charges in said fourth type of photoelectric conversion elements are read out during a fourth 1 V period, thereby reading out all electric charges in 4 V periods following said sweeping out step.

9. A method according to claim 8, further comprising the step in the still mode of:

applying light to said first, second, third, and fourth types of photoelectric conversion elements prior to said sweeping out step when performing instant exposures.

10. A method according to claim 8, further comprising the step in the still mode of:

amplifying a signal representing said read out electric charges by 4/5 when performing continuous exposure.

11. A solid state image pickup device, comprising:

a plurality of first, second, third, and fourth types of photoelectric conversion elements disposed in matrix form on a semiconductor substrate, said plurality of first, second, third, and fourth types of photoelectric conversion elements storing electric charges;

a plurality of columns of vertical CCDs disposed in juxtaposition with each column of said photoelectric conversion elements;

a horizontal CCD connected in common to said plurality of columns of vertical CCDs;

a controller generating control signals to control said plurality of first, second, third, and fourth types of photoelectric conversion elements, said plurality of columns of vertical CCDs, and said horizontal CCD;

in a monitor mode,
    said first and second types of photoelectric conversion elements transferring electric charges into vertical CCDs of said plurality of columns of vertical CCDs in accordance with said control signals,
    said plurality of columns of vertical CCDs mixing said electric charges from said first and second types of photoelectric conversion elements, and transferring said electric charges from said first and second types of photoelectric conversion elements in a vertical direction to said horizontal CCD in accordance with said control signals,
    said horizontal CCD transferring said mixed electric charges from said first and second types of photoelectric conversion elements in a horizontal direction in accordance with said control signals, and in said still mode,
    said first type of photoelectric conversion elements transferring electric charges into vertical CCDs of said plurality of columns of vertical CCDs in accordance with said control signals,
    said plurality of columns of vertical CCDs transferring said electric charges from said first type of photoelectric conversion elements in a vertical direction to said horizontal CCD in accordance with said control signals;
    said horizontal CCD transferring said electric charges from said first type of photoelectric conversion elements in a horizontal direction in accordance with said control signals; and saturation amount setting means for setting a saturated electric charge amount of said plurality of first, second, third and fourth types of photoelectric conversion elements in said monitor mode to one half a saturated electric charge amount in said still mode in accordance with said control signals.

12. A solid state image pickup device according to claim 11, wherein said saturation amount setting means adjusts a voltage applied to said semiconductor substrate to set said saturated electric charge amount during said monitor mode to one half said saturated electric charge amount during said still mode in accordance with said control signals.

13. A solid state image pickup device according to claim 11, wherein said saturation amount setting means adjusts a voltage applied to said semiconductor substrate so as to set said saturated electric charge amount to said saturated electric charge amount during said still mode upon entering said still mode after said monitor mode.

14. A solid state image pickup device according to claim 11, wherein said controller includes a control and drive circuit for controlling said plurality of vertical CCD columns and said horizontal CCD, in said still mode, to clear electric charges from said photoelectric charge elements during $4n * V$ periods, where n is a positive integer and V is a vertical scan period.

15. A solid state image pickup device according to claim 14, wherein said control and drive circuit controls said plurality of vertical CCD columns and said horizontal CCD, in said still mode, to sweep out smear electric charges from said vertical CCDs during a 1 V period following the clearing of electric charges.

16. A solid state image pickup device according to claim 15, wherein said control and drive circuit controls said plurality of vertical CCD columns and said horizontal CCD, in said still mode, to read out electric charges, following said sweep out of smear electric charges, in said first, second, third and fourth types of photoelectric conversion elements during consecutive 1 V periods, respectively, so that electric charges in said first type of photoelectric conversion elements are read out during a first 1 V period, electric charges in said second type of photoelectric conversion elements are read out during a second 1 V period, electric charges in said third type of photoelectric conversion elements are read out during a third 1 V period, and electric charges in said fourth type of photoelectric conversion elements are read out during a fourth 1 V period, thereby reading out all electric charges in 4 V periods following said sweep out of smear electric charges.

17. A solid state image pickup device according to claim 16, further comprising:

a light source for applying light to said first, second, third, and fourth types of photoelectric conversion elements prior to said sweep out of smear electric charges when performing instant exposure.

18. A solid state image pickup device according to claim 16, further comprising:

amplifying means for amplifying a signal representing said read out electric charges by 4/5 when performing continuous exposure.

19. A solid state image pickup device comprising:

a number of four types of photoelectric conversion elements disposed in a matrix shape;

a plurality of columns of vertical CCDs each disposed in juxtaposition with each column of said photoelectric conversion elements;

a horizontal CCD connected in common to one end of each of said plurality of columns of vertical CCDs; and saturated electric charge amount setting mean setting the saturated electric charge amount of photoelectric conversion elements in a monitor mode in which two types of said photoelectric conversion elements transfer electric charges to said vertical CCDs, to a value less than the saturated electric charge amount in a still mode, in which one type of said photoelectric conversion elements transfers electric charges to said vertical CCDs.

* * * * *